(12) United States Patent
Long et al.

(10) Patent No.: US 8,037,988 B2
(45) Date of Patent: Oct. 18, 2011

(54) CONTROL SYSTEM FOR A TRANSMISSION WITH A DUAL AREA APPLY PISTON FOR A TORQUE-TRANSMITTING MECHANISM ENGAGEMENT

(75) Inventors: Charles F. Long, Pittsboro, IN (US); Phillip F. McCauley, Zionsville, IN (US); Jeffrey J. Cole, Plainfield, IN (US)

(73) Assignee: GM Global Technology Operations LLC, Detroit, MI (US)

(*) Notice: Subject to any disclaimer, the term of this patent is extended or adjusted under 35 U.S.C. 154(b) by 1055 days.

(21) Appl. No.: 11/862,380

(22) Filed: Sep. 27, 2007

(65) Prior Publication Data

US 2009/0088296 A1 Apr. 2, 2009

(51) Int. Cl.
*F16D 25/12* (2006.01)
(52) U.S. Cl. .................. 192/85.63; 192/85.32
(58) Field of Classification Search ............... 192/85.32
See application file for complete search history.

(56) References Cited

U.S. PATENT DOCUMENTS

| | | | |
|---|---|---|---|
| 6,382,248 B1 * | 5/2002 | Long et al. | 137/557 |
| 6,705,447 B2 * | 3/2004 | Gorman et al. | 192/85.25 |
| 7,104,380 B2 * | 9/2006 | Bishop et al. | 192/85.32 |

FOREIGN PATENT DOCUMENTS

| | | |
|---|---|---|
| CN | 1200444 A | 12/1898 |
| CN | 1200996 A | 12/1998 |
| DE | 19823772 A1 | 12/1998 |

* cited by examiner

*Primary Examiner* — Rodney Bonck
(74) *Attorney, Agent, or Firm* — Quinn Law Group, PLLC

(57) ABSTRACT

A control system is provided for selectively actuating a dual area apply piston having first and second piston areas each selectively biased by hydraulic pressure within a respective first and second fill cavities. The control system includes a pressure regulator valve, a dual area activation valve, and a solenoid valve operable to selectively and variable operate the pressure regulator valve to effect biasing of the first and second piston areas by communicating hydraulic pressure to the first fill cavity and/or the second fill cavity.

15 Claims, 5 Drawing Sheets

| Range | C1 | C2 | C3 | C4 | C5 | C6 |
|---|---|---|---|---|---|---|
| FWD 1 | | | | | x | x |
| FWD 2 | x | | | | x | |
| FWD 3 | x | | | | | x |
| FWD 4 | x | | | x | | |
| FWD 5 | x | | x | | | |
| FWD 6 | x | x | | | | |
| FWD 7 | | x | x | | | |
| FWD 8 | | x | | x | | |
| FWD 9 | | x | | | | x |
| REV 1 | | | x | | x | |
| Neutral | | | | | x | |

CONTROL SYSTEM FOR A TRANSMISSION WITH A DUAL AREA APPLY PISTON FOR A TORQUE-TRANSMITTING MECHANISM ENGAGEMENT

TECHNICAL FIELD

The invention relates to a control system for a transmission; specifically, for pressurizing one or both areas of a dual area apply piston to engage a torque-transmitting mechanism.

BACKGROUND OF THE INVENTION

Dual area apply pistons have two piston areas to which hydraulic pressure may be individually fed in order to engage a torque-transmitting mechanism. During operating conditions in which a high torque capacity is required, such as in a low range or a starting gear to handle stall torque, both piston areas are fed hydraulic pressure. Because hydraulic pressure is thus applied over a greater area, a larger force is applied to engage the torque-transmitting mechanism, resulting in a larger torque capacity (also referred to as clutch capacity). During operating conditions in which less torque capacity is required, such as when operating in higher speed ratios, only one of the piston areas is fed hydraulic pressure, thus engaging the torque-transmitting mechanism, but at a lesser torque capacity and with a faster fill time of the clutch cavity. Typically, a dual area apply piston requires the use of two separate trim systems to direct hydraulic pressure to each separate piston area fill cavity (i.e., each fill cavity typically requires a separate, dedicated solenoid valve and trim valve that direct hydraulic pressure to the fill cavity when the solenoid valve is energized).

SUMMARY OF THE INVENTION

A torque-transmitting mechanism engagable by application of a dual area apply piston allows the ability to operate the torque-transmitting mechanism at a lower torque capacity when appropriate, which may reduce the overall pump size, and associated losses therewith, required for the hydraulic control system that controls engagement of the torque-transmitting mechanism and allow faster clutch cavity fill times. A high clutch gain (i.e., the ratio of torque to clutch pressure of the control system) results in increased shift-to-shift variation and temperature inconsistency. Thus, the ability to operate at a lower torque capacity, when appropriate, improves shift quality, and results in better shift consistency.

A control system is provided for selectively actuating a dual area apply piston having first and second piston areas each selectively biased by hydraulic pressure within a respective first and second fill cavities. The dual area apply piston is operable to engage a torque-transmitting mechanism. The control system includes a line pressure source of hydraulic pressure and a pressure regulator valve in communication with the line pressure source. The pressure regulator valve has a spring set position, a trim position, and a pressure set position and is operable to selectively and variably communicate hydraulic pressure from the line pressure source to the first fill cavity when the pressure regulator valve is in one of the trim position and the pressure set position. A dual area activation valve is provided in communication with the pressure regulator valve. The dual area activation valve has a spring set position and a pressure set position. The dual area activation valve is operable to selectively communicate hydraulic pressure from the line pressure source to the second fill cavity via the pressure regulator valve when the pressure regulator valve is in the pressure set position and the dual area activation valve is in the pressure set position. An automatically shiftable transmission is also provided incorporating the disclosed control system.

A dual area apply piston is provided for selective engagement of a torque-transmitting mechanism. The dual area apply piston is selectively operated by the disclosed control system. The dual area apply piston includes a first piston area selectively biased by hydraulic pressure within a first fill cavity and a second piston area selectively biased by hydraulic pressure within a second fill cavity. An orifice interconnects the first and second fill cavities and is operable to purge air from the first fill cavity into the second fill cavity. A flow regulation device, such as a check valve or orifice, may be provided in communication with the second fill cavity and is operable to reduce vacuum within the second fill cavity when the first piston area is biased.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figures 1, 2:
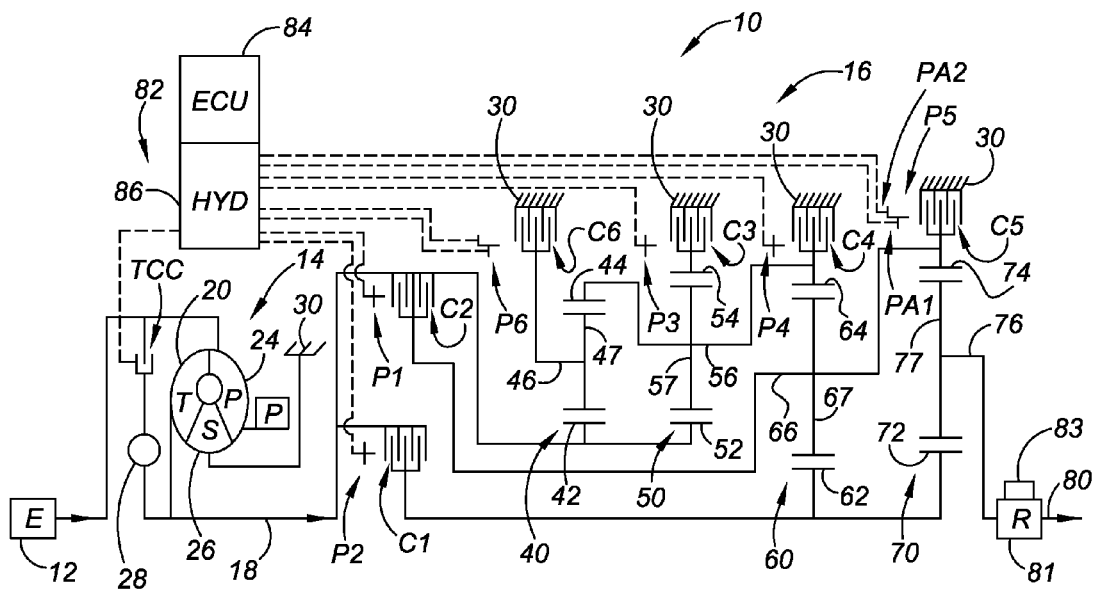
FIG. 1 is a schematic representation of a multi-speed transmission having torque-transmitting mechanisms engaged and disengaged via a control system within the scope of the invention, including a torque-transmitting mechanism engagable via a dual area apply piston.
FIG. 2 is a chart showing an engagement schedule of the torque-transmitting mechanisms of the transmission of FIG. 1.

Referring to the drawings, wherein like reference numbers represent the same or corresponding parts throughout the several views, there is shown in FIG. 1 a powertrain 10. The powertrain 10 includes a power source or engine 12, a torque converter 14 and a multi-speed transmission 16. The torque converter 14 is connected with the engine 12 and with a transmission input member 18 via a turbine 20. The selective engagement of a torque converter clutch TCC allows the engine 12 to be directly connected with the input shaft 18, bypassing the torque converter 14. The input member 18 is typically a shaft, and may be referred to as an input shaft herein. The torque converter 14 includes the turbine 20, a pump 24 and a stator 26. The converter stator 26 is grounded to a casing 30 through a typical one-way clutch that is not shown. A damper 28 is operatively connected to the engaged torque converter clutch TCC for absorbing vibration.

The transmission 16 includes a first planetary gear set 40, a second planetary gear set 50, a third planetary gear set 60, and a fourth planetary gear set 70. The first planetary gear set 40 includes a sun gear member 42, a ring gear member 44, and a carrier member 46 rotatably supporting a plurality of pinion gears 47 that intermesh with both the ring gear member 44 and the sun gear member 42. The second planetary gear set 50 includes a sun gear member 52, a ring gear member 54, and a carrier member 56 rotatably supporting a plurality of pinion gears 57 that intermesh with both the ring gear member 54 and the sun gear member 52. The third planetary gear set 60 includes a sun gear member 62, a ring gear member 64, and a carrier member 66 rotatably supporting a plurality of pinion gears 67 that intermesh with both the ring gear member 64 and the sun gear member 62. The fourth planetary gear set 70 includes a sun gear member 72, a ring gear member 74, and a carrier member 76 rotatably supporting a plurality of pinion gears 77 that intermesh with both the ring gear member 74 and the sun gear member 72.

The transmission 16 further includes a plurality of torque-transmitting mechanisms, including the torque converter clutch TCC, two rotating clutches: C1 and C2; and four stationary clutches or brakes C3, C4, C5 and C6. Torque is transferred from the input member 18 to an output member 80 along various powerflow paths through the transmission 16 depending on which of the plurality of selectively engagable torque-transmitting mechanisms are engaged. A retarder 81 is operatively connected to the output shaft 80 and is controllable to slow the output shaft 80 during certain vehicle operating conditions. The retarder 81 may be any of the many types known to those skilled in the art.

The input member 18 is continuously connected for common rotation with sun gear members 42 and 52. The output member 80 is continuously connected for common rotation with carrier member 76. C1 is selectively engagable to connect the input member 18 for common rotation with sun gear members 62 and 72. C2 is selectively engagable to connect the input member 18 for common rotation with carrier member 76 and ring gear member 74. C3 is selectively engagable to ground ring gear member 54 to the transmission casing 30. C4 is selectively engagable to ground ring gear member 64, carrier member 56 and ring gear member 44 to the transmission casing 30. C5 is selectively engagable to ground ring gear member 74 and carrier member 66 to the transmission casing 30. C6 is selectively engagable to ground carrier member 46 to the transmission casing 30.

The selective engagement and disengagement of the torque-transmitting mechanisms is controlled by an electro-hydraulic control system 82. The electro-hydraulic control system 82 includes an electronic controller 84, which may be one or more control units and is referred to as ECU in FIG. 1, as well as a hydraulic control portion 86 referred to as HYD in FIG. 1. The electronic controller 84 is programmable to provide electrical control signals to the hydraulic control portion 86 to establish the hydraulic pressures that control engagement and disengagement of the torque-transmitting mechanisms TCC, C1, C2, C3, C4, C5 and C6. The hydraulic control portion 86 is operatively connected to each of the torque-transmitting mechanisms TCC, C1, C2, C3, C4, C5 and C6 by a fluid connection illustrated only schematically as dashed lines in FIG. 1. The hydraulic control portion 86 provides hydraulic pressure to apply pistons that apply pressure to the torque-transmitting mechanisms TCC, C1, C2, C3, C4, C5 and C6 to cause frictional engagement of friction and reaction plates of the torque-transmitting mechanisms TCC, C1, C2, C3, C4, C5 and C6 to establish the desired operative connections.

Referring to FIG. 2, an engagement schedule indicates with an "X" each of the torque-transmitting mechanisms C1, C2, C3, C4, C5 and C6 that are engaged to establish each of nine forward speed ratios FWD1, FWD2, FWD3, FWD4, FWD5, FWD6, FWD7, FWD8, and FWD9, as well as a Neutral mode and a reverse speed ratio REV1.

Referring again to FIG. 1, single-area apply pistons P1, P2, P3 and P4 are in fluid communication with the hydraulic pressure supplied by the hydraulic control portion 86 to engage the torque-transmitting mechanisms C1, C2, C3, and C4 according to the engagement schedule of FIG. 2. A single-area apply piston has only one effective surface area to which hydraulic pressure is applied to cause engagement of the adjacent torque-transmitting mechanism. Assuming a constant apply pressure, torque-transmitting mechanisms engaged by a single-area piston have a single clutch capacity (i.e., torque capacity). Dual area apply pistons P5 and P6 are used to engage torque-transmitting mechanisms C5 and C6, respectively. The dual area apply piston P5 has two piston areas, a first piston area PA1, and a second piston area PA2, each with a respective fill cavity 112 and 114, shown in FIGS. 3 through 6, to which hydraulic pressure may be separately routed by the hydraulic control portion 86 so that the dual area apply piston P5 is applied with less force when hydraulic pressure is supplied to only one of the piston areas PA1 or PA2, and with greater force when hydraulic pressure is supplied to both of the piston areas PA1 and PA2. As is apparent in FIG. 2, torque-transmitting mechanism C5 is engaged in the first forward speed ratio FWD1 and the reverse speed ratio REV1. In those speed ratios, more torque is required at the output member 80, and thus greater clutch capacity is required by torque-transmitting mechanism C5. However, in the second forward speed ratio FWD2, the torque required is significantly less. In similar fashion, the dual area apply piston P6 is supplied to engage torque-transmitting mechanism C6 with hydraulic pressure supplied to both a first piston area and a second piston area in the first forward speed ratio FWD1, and applied to only the first piston area in the ninth forward speed ratio FWD9, as far greater clutch capacity is required in the first forward speed ratio FWD1 than in the ninth forward speed ratio FWD9. The first piston area of the torque-transmitting mechanism C6 is employed for trimming thereby providing precise control of the on-coming torque-transmitting mechanism C6. Eventually, the second piston area is employed to fully engage the torque-transmitting mechanism C6.

Figure 3:
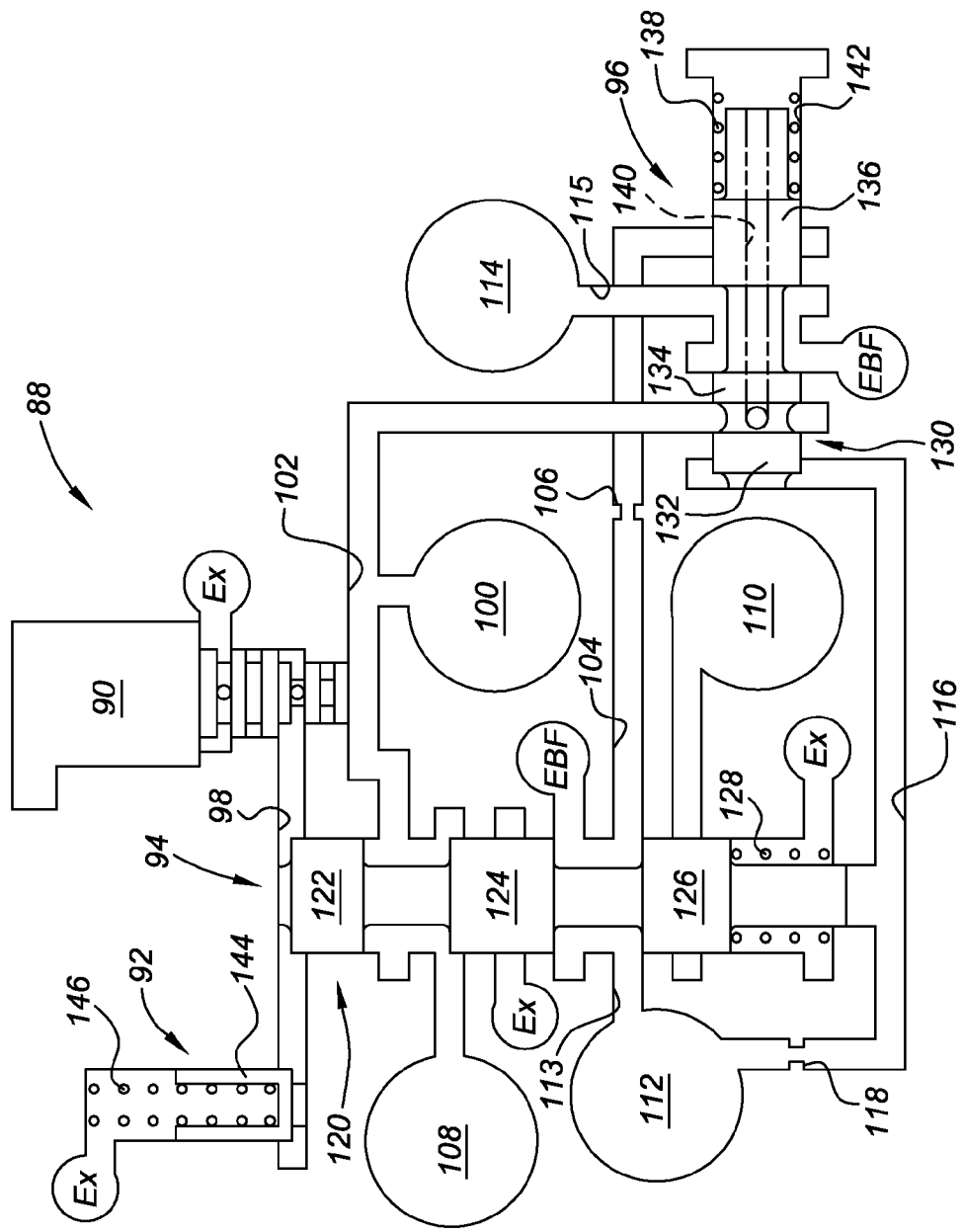
FIG. 3 is a schematic diagrammatic representation of a control system operable to effect the engagement of the torque-transmitting mechanism engagable via the dual area apply piston of FIG. 1, shown in the torque transmitting mechanism disengaged state.
Figure 4:
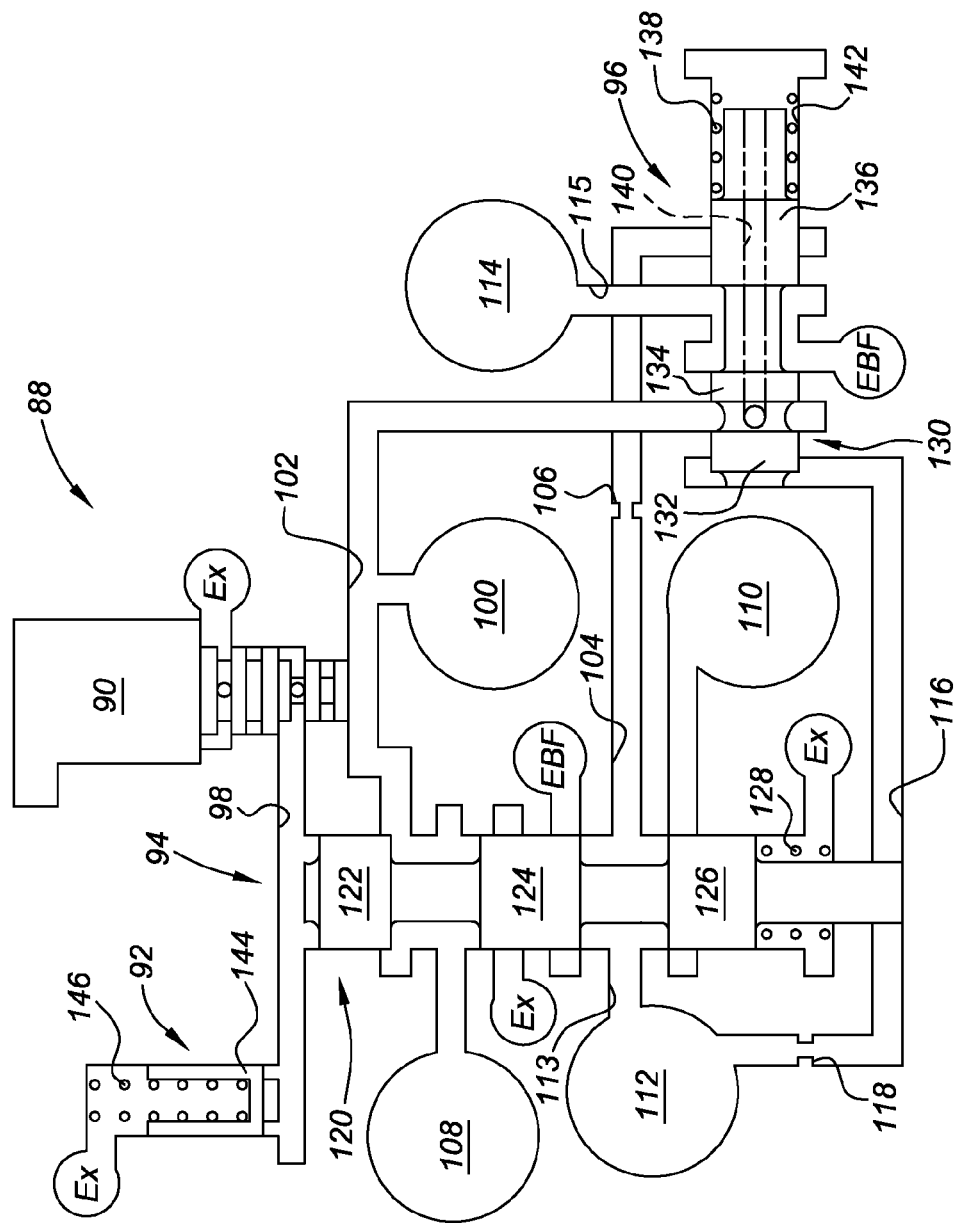
FIG. 4 is a schematic diagrammatic representation of the control system of FIG. 3 shown in the torque transmitting mechanism trimmed state.
Figure 5:
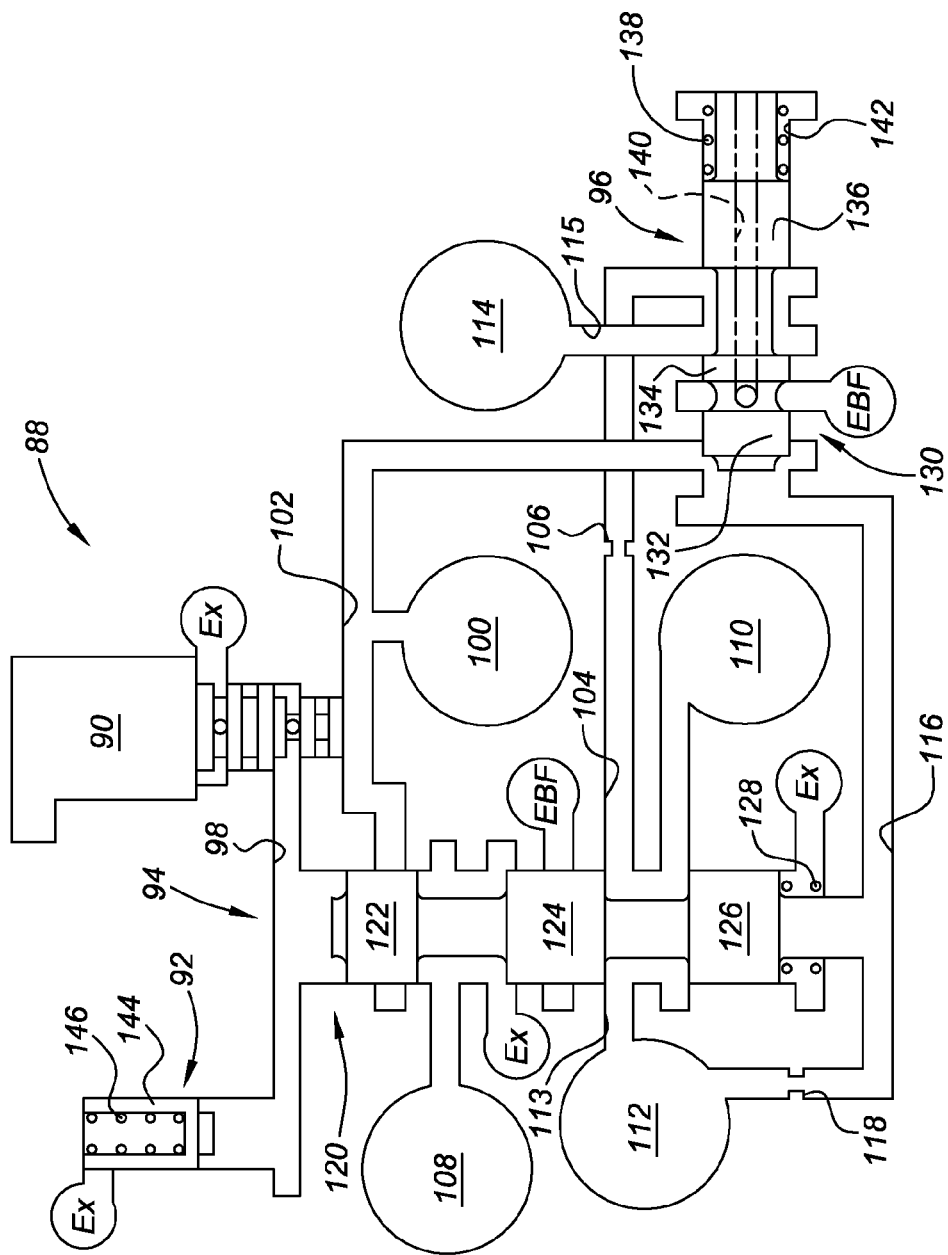
FIG. 5 is a schematic diagrammatic representation of the control system of FIGS. 3 and 4 shown in the torque transmitting mechanism engaged state.

Referring to FIGS. 3 through 5 and with continued reference to FIG. 1, there is shown a control system 88 incorporated within the hydraulic control portion 86 illustrated schematically in FIG. 1. The control system 88 is operable to selectively and variably communicate hydraulic pressure to at least one of the first piston area PA1 and the second piston area PA2 of the dual area apply piston P5. Although the following discussion with regard to the control system 88 relates to the control of the dual area apply piston P5, those skilled in the art will recognize that the control system 88 may be employed to control the operation of the dual area apply piston P6 as well. The control system 88 includes a solenoid valve 90, accumulator 92, regulator valve 94, and a dual area activation valve 96. The solenoid valve 90, such as a variable bleed solenoid valve, is operable to selectively and variably communicate hydraulic pressure to the regulator valve 94 and the accumulator 92 through a control passage 98. The solenoid valve 90 is in communication with a control pressure source 100 through passage 102. Additionally, passage 102 is operable to communicate hydraulic pressure from the control pressure source 100 to the regulator valve 94 and the dual area activation valve 96. Further, a passage 104 is provided in communication with the regulator valve 94 and the dual area activation valve 96 through an orifice 106. A pressure switch 108 is provided in communication with the regulator valve 94 and is operable to provide signals with regard to the state of operation of the regulator valve 94 to the electronic control unit 84 of FIG. 1.

A line pressure source 110, such as from a positive displacement hydraulic pump, provides a supply of hydraulic pressure to the regulator valve 94 to enable selective operation of the dual area apply piston P5, shown in FIG. 1. A first fill cavity 112 is in selective communication with the line pressure source 110 through the regulator valve 94 via feed passage 113. When pressurized with hydraulic pressure, first fill cavity 112 will bias the first piston area PA1 of the dual area apply piston P5. A second fill cavity 114 is in selective communication with the first fill cavity 112 through the regulator valve 94 and the dual area activation valve 96 via feed passage 115. When pressurized with hydraulic pressure, the second fill cavity 114 will bias the second piston area PA2 of the dual area apply piston P5. A plurality of exhaust passages, indicated as EX in FIGS. 3-5, are provided to selectively exhaust hydraulic pressure from the solenoid valve 90, accumulator 92, regulator valve 94, and dual area activation valve 96. Exhaust backfill passages, indicated as EBF in FIGS. 3-5, are provided in communication with the regulator valve 94 and the dual area activation valve 96 and are operable to provide a negligible amount of hydraulic pressure to the first and second fill cavities 112 and 114 when the respective first and second piston areas PA1 and PA2 are disengaged. In so doing, the time required to fill the first and second fill cavities 112 and 114 is reduced. A feedback passage 116 is operable to communicate hydraulic pressure from the first fill cavity 112 to the regulator valve 94 and the dual area activation valve 96 through an orifice 118.

The regulator valve 94 includes a valve spool 120 having a first, second, and third land 122, 124, and 126 formed respectively thereon. The valve spool 120 is biased into a spring set position, as shown in FIG. 3, by a spring 128. The dual area activation valve 96 includes a valve spool 130 having a first, second, and third land 132, 134, and 136 formed respectively thereon. The valve spool 120 is biased into a spring set position, as shown in FIGS. 3 and 4, by a spring 138. The valve spool 130 defines a passage 140 which extends longitudinally along the valve spool 130 from between the first and second lands 132 and 134 to a spring pocket 142, within which the spring 138 is contained. The accumulator 92 includes a piston 144 biased by a spring 146. The piston 144 and spring 146 cooperate to provided hydraulic compliance within the control passage 98 thereby reducing or attenuating any hydraulic pressure spikes within the control passage 98 for improved control of the regulator valve 94.

The operation of the control system 88 is discussed in detail hereinbelow with reference to FIGS. 3-5. FIG. 3 illustrates the control system 88 in a torque-transmitting mechanism disengaged condition. In the disengaged condition the first and second fill cavities 112 and 114 communicate with exhaust backfill passages EBF associated with the regulator valve 94 and the dual area activation valve 96, respectively. As such, the hydraulic pressure provided to the first and second fill cavities 112 and 114 is of insufficient magnitude to bias the first and second piston areas PA1 and PA2 of the dual area apply piston P5. With the control system 88 in the disengaged mode of operation, the hydraulic pressure within the control passage 98 is exhausted through the solenoid valve 90. As a result, the valve spool 120 is biased to the spring set position within the regulator valve 94. With the valve spool 120 in the spring set position, the land 126 blocks the communication of hydraulic pressure from the line pressure source 110 to the first fill cavity 112. The hydraulic pressure within the feedback passage 116 is of insufficient magnitude to bias the dual area activation valve 96 out of the spring set position. Hydraulic pressure is communicated to the pressure switch 108 through the regulator valve 94 via passage 102. Additionally, hydraulic pressure is communicated to the spring pocket 142 of the dual area activation valve 96 via passage 140 and is operable to provide a biasing force, along with the spring 138, to maintain the valve spool 130 in the spring set position.

FIG. 4 illustrates the control system 88 in a torque-transmitting mechanism trimmed condition. In the trimmed condition, the first fill cavity 112 selectively and variably communicates with the line pressure source 110 through the regulator valve 94 to allow regulated hydraulic pressure into the first fill cavity 112 to bias the first piston area PA1 of the dual area apply piston P5. The second fill cavity 114 communicates with exhaust backfill passages EBF associated with the dual area activation valve 96. As such, the hydraulic pressure provided to the second fill cavity 114 is of insufficient magnitude to bias the second piston area PA2 of the dual area apply piston P5. With the control system 88 in the trimmed mode of operation, the hydraulic pressure within the control passage 98 is increased by communicating hydraulic pressure from the control pressure source 100 to the control passage 98 via the solenoid valve 90's variable bleed to exhaust. As a result, the valve spool 120 is biased to a trim position within the regulator valve 94, as shown in FIG. 4. With the valve spool 120 in the trim position, the land 126 selectively and variably enables the communication of hydraulic pressure from the line pressure source 110 to the first fill cavity 112. The hydraulic pressure within the feedback passage 116 is of insufficient magnitude to bias the dual area activation valve 96 out of the spring set position. Hydraulic pressure is communicated to the pressure switch 108 through the regulator valve 94 via passage 102. Additionally, hydraulic pressure is communicated to the spring pocket 142 of the dual area activation valve 96 via passage 140 and is operable to provide a biasing force, along with the spring 138, to maintain the valve spool 130 in the spring set position. This mode of operation is advantageous to allow precise control of the torque-transmitting mechanism C5 associated with the dual area apply piston P5, both shown in FIG. 1, in gear ratios requiring a reduced amount of apply force.

FIG. 5 illustrates the control system 88 in a torque-transmitting mechanism engaged condition. In the engaged condition, the first fill cavity 112 communicates with the line pressure source 110 through the regulator valve 94 to allow unregulated hydraulic pressure into the first fill cavity 112 to bias the first piston area PA1 of the dual area apply piston P5, shown in FIG. 1. The second fill cavity 114 also communicates with line pressure source 110 through the regulator valve 94 and the dual area activation valve 96 to bias the second piston area PA2 of the dual area apply piston P5. With the control system 88 in the engaged mode of operation, the hydraulic pressure within the control passage 98 is increased by communicating hydraulic pressure from the control pressure source 100 to the control passage 98 via the solenoid valve 90. As a result, the valve spool 120 is biased to a pressure set position within the regulator valve 94, as shown in FIG. 5. The orifice 118 is operable to maintain the feedback passage 116 at a predetermined maximum fluid pressure level. When the fluid pressure within the control passage 98 is sufficiently large enough to overcome the pressure on the valve spool 120, created by the fluid pressure within the feedback passage 116, and the force of the spring 128, the valve spool 120 will move to the pressure set position thereby enabling the pressure regulator valve 94 to operate as a boost valve. With the valve spool 120 in the pressure set position, the land 126 enables unrestricted communication of hydraulic pressure from the line pressure source 110 to the first fill cavity 112. Additionally, the hydraulic pressure within the feedback passage 116 is of sufficient magnitude to bias the dual area activation valve 96 into a pressure set position, as shown in FIG. 5. The land 122 blocks passage 102 to restrict the communication of hydraulic pressure from the control pressure source 100 to the pressure switch 108. Additionally, hydraulic pressure within the spring pocket 142 of the dual area activation valve 96 is communicated, via passage 140, to the exhaust backfill passage associated with the dual area activation valve 96. Therefore, the spring 138 is unable to provide the biasing force necessary to resist the hydraulic pressure within the feedback passage 116 operable to place the valve spool 130 in the pressure set position. The boost feature provided by this mode of operation is advantageous to allow control of the torque-transmitting mechanism C5 associated with the dual area apply piston P5, both shown in FIG. 1, in gear ratios requiring a large amount of apply force. Additionally, the control system 88 includes an amount of hysteresis since the dual area activation valve 96 will remain in the pressure set position to maintain hydraulic pressure within the second fill cavity 114 even as the hydraulic pressure within the line pressure source 110 is lowered.

Figure 6:
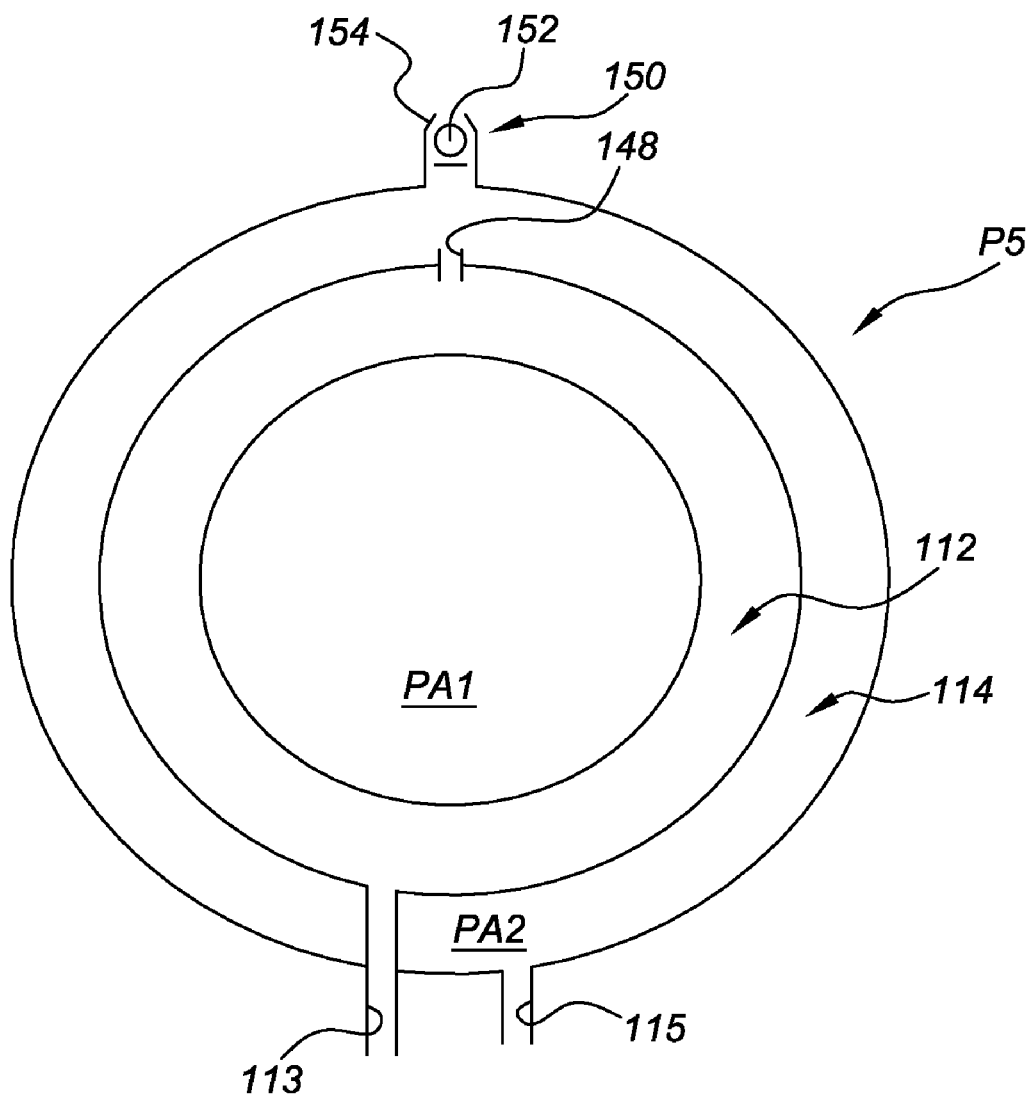
FIG. 6 is a schematic diagrammatic representation of a dual area apply piston for use with the control system of FIGS. 3 through 5.

Referring to FIG. 6 and with continued reference to FIGS. 1 and 3-5, there is schematically depicted the dual area apply piston P5 of FIG. 1. As described hereinabove, the dual area apply piston P5 includes the first piston area PA1 and the second piston area PA2 each selectively biased by the presence of hydraulic pressure within the respective first and second fill cavities 112 and 114. As described hereinabove, the respective feed passages 113 and 115 communicate hydraulic pressure to the first and second fill cavities 112 and 114. The dual area apply piston P5 further includes an air bleed orifice 148 allowing communication between the first and second fill cavities 112 and 114. Additionally, the dual area apply piston P5 includes a flow regulation device 150, such as a check valve, having a movable ball 152 contained therein operable to selectively block an orifice 154 defined by the flow regulation device 150. The air bleed orifice 148 provides a means of purging air that may be contained within the first fill cavity 112 to enable precise biasing of the first piston area PA1 during operation of the dual area apply piston P5. When the first piston area PA1 of the dual area apply piston P5 is biased or stroked, a vacuum may develop within the second fill cavity 114 which may impede the movement of the first piston area PA1. The flow regulation device 150 is operable to reduce or eliminate the vacuum formed within the second fill cavity 114 to allow the free movement of the first piston area PA1. Should a vacuum develop within the second fill cavity 114, the movable ball 152 will unblock the orifice 154 allowing air to enter the second fill cavity 114 thereby eliminating or reducing the amount of vacuum contained therein. Upon pressurization of the second fill cavity 114, the hydraulic pressure will bias the movable ball 152 to block the orifice 154 thereby eliminating a potential leak path for hydraulic pressure. Additionally, the flow regulation device 150 may operate without the movable ball 152 such that only the orifice 154 is provided to reduce or eliminate vacuum within the second fill cavity 114. Such an arrangement will allow a small amount of fluid pressure to leak form the second fill cavity 114, upon pressurization thereof, to simplify the construction of the flow regulation device 150.

While the best modes for carrying out the invention have been described in detail, those familiar with the art to which this invention relates will recognize various alternative designs and embodiments for practicing the invention within the scope of the appended claims.

The invention claimed is:

1. A control system for selectively actuating a dual area apply piston having first and second piston areas each selectively biased by hydraulic pressure within a respective first and second fill cavities, the dual area apply piston being operable to engage a torque-transmitting mechanism, the control system comprising:
 a line pressure source of hydraulic pressure;
 a pressure regulator valve in communication with said line pressure source;
 wherein said pressure regulator valve has a spring set position, a trim position, and a pressure set position;
 wherein said pressure regulator valve is operable to selectively and variably communicate hydraulic pressure from said line pressure source to the first fill cavity when said pressure regulator valve is in one of said trim position and said pressure set position;
 a dual area activation valve in communication with said pressure regulator valve;
 wherein said dual area activation valve has a spring set position and a pressure set position; and
 wherein said dual area activation valve is operable to selectively communicate hydraulic pressure from said line pressure source to the second fill cavity via said pressure regulator valve when said pressure regulator valve is in said pressure set position and said dual area activation valve is in said pressure set position.

2. The control system of claim 1, wherein said dual area activation valve is operable to block the communication of hydraulic pressure to the second fill cavity when said dual area activation valve is in said spring set position.

3. The control system of claim 1, further comprising a feedback passage operable to communicate hydraulic pressure between the first fill cavity and said dual area activation valve to selectively bias the dual area activation valve from said spring set position to said pressure set position.

4. The control system of claim 1, further comprising:
 a control pressure source of hydraulic pressure;
 a control passage in communication with said pressure regulator valve;
 a solenoid valve in communication with said control passage and said control pressure source; and
 wherein said solenoid valve is operable to selectively and variably communicate hydraulic pressure from said control pressure source to said pressure regulator valve to bias said pressure regulator valve from said spring set position to one of said trim position and said pressure set position.

5. The control system of claim 4, further comprising:
 a pressure switch in communication with said pressure regulator valve;
 wherein said pressure regulator valve is in communication with said control pressure source; and
 wherein said pressure regulator valve is operable to communicate hydraulic pressure from said control pressure source to said pressure switch when said pressure regulator valve is in one of said trim position and said spring set position.

6. The control system of claim 5, wherein said pressure regulator valve is operable to block communication of hydraulic pressure from said control pressure source to said pressure switch when said pressure regulator valve is in said pressure set position.

7. The control system of claim 4, further comprising an accumulator in communication with said control passage and operable to attenuate pressure spikes within said control passage.

8. The control system of claim 1, further comprising:
a first exhaust backfill passage in communication with said pressure regulator valve;
a second exhaust backfill passage in communication with said dual area activation valve;
wherein the first fill cavity communicates with said first exhaust backfill passage when said pressure regulator valve is in said spring set position; and
wherein the second fill cavity communicates with said second exhaust backfill passage when said dual area activation valve is in said spring set position.

9. An automatically shiftable transmission comprising:
at least one dual area apply piston;
at least one torque-transmitting mechanism selectively engageable by said at least one dual area apply piston;
wherein said at least one dual area apply piston includes first and second piston areas each selectively biased by hydraulic pressure within a respective first and second fill cavity;
a control system for selectively actuating said dual area apply piston, the control system including:
a line pressure source of hydraulic pressure;
a pressure regulator valve in communication with said line pressure source;
wherein said pressure regulator valve has a spring set position, a trim position, and a pressure set position;
wherein said pressure regulator valve is operable to selectively and variably communicate hydraulic pressure from said line pressure source to said first fill cavity when said pressure regulator valve is in one of said trim position and said pressure set position;
a dual area activation valve in communication with said pressure regulator valve;
wherein said dual area activation valve has a spring set position and a pressure set position; and
wherein said dual area activation valve is operable to selectively communicate hydraulic pressure from said line pressure source to said second fill cavity via said pressure regulator valve when said pressure regulator valve is in said pressure set position and said dual area activation valve is in said pressure set position.

10. The automatically shiftable transmission of claim 9, wherein said dual area activation valve is operable to block the communication of hydraulic pressure to said second fill cavity when said dual area activation valve is in said spring set position.

11. The automatically shiftable transmission of claim 9, further comprising a feedback passage operable to communicate hydraulic pressure between said first fill cavity and said dual area activation valve to selectively bias the dual area activation valve from said spring set position to said pressure set position.

12. The automatically shiftable transmission of claim 9, further comprising:
a control pressure source of hydraulic pressure;
a control passage in communication with said pressure regulator valve;
a solenoid valve in communication with said control passage and said control pressure source; and
wherein said solenoid valve is operable to selectively and variably communicate hydraulic pressure from said control pressure source to said pressure regulator valve to bias said pressure regulator valve from said spring set position to one of said trim position and said pressure set position.

13. The automatically shiftable transmission of claim 9, further comprising:
a first exhaust backfill passage in communication with said pressure regulator valve;
a second exhaust backfill passage in communication with said dual area activation valve;
wherein said first fill cavity communicates with said first exhaust backfill passage when said pressure regulator valve is in said spring set position; and
wherein said second fill cavity communicates with said second exhaust backfill passage when said dual area activation valve is in said spring set position.

14. The automatically shiftable transmission of claim 9, further comprising an orifice interconnecting said first and second fill cavities and operable to purge air from said first fill cavity into said second fill cavity.

15. The automatically shiftable transmission of claim 9, further comprising a flow regulation device in communication with said second fill cavity and operable to reduce vacuum within said second fill cavity when said first piston area is biased.

* * * * *